(12) United States Patent
Luo

(10) Patent No.: US 11,641,811 B2
(45) Date of Patent: May 9, 2023

(54) SPRAYING AND RE-HEATING VAPOR REACTOR AND GENERATOR APPARATUS USING THE SAME

(71) Applicants: BIG SUN ENERGY TECHNOLOGY INC., Hukou Township (TW); Chia Ching Luo, Hukou Township (TW)

(72) Inventor: Chia Ching Luo, Hukou Township (TW)

(73) Assignees: BIG SUN ENERGY TECHNOLOGY INC., Hukou Township (TW); Chia Ching Luo, Hukou Township (TW)

( * ) Notice: Subject to any disclaimer, the term of this patent is extended or adjusted under 35 U.S.C. 154(b) by 0 days.

(21) Appl. No.: 17/678,586

(22) Filed: Feb. 23, 2022

(65) Prior Publication Data

US 2023/0089183 A1 Mar. 23, 2023

(30) Foreign Application Priority Data

Sep. 22, 2021 (TW) .................................. 110135040

(51) Int. Cl.
*F22B 27/16* (2006.01)
*A01G 9/24* (2006.01)
(Continued)

(52) U.S. Cl.
CPC .............. *A01G 9/245* (2013.01); *F22B 27/16* (2013.01); *F28D 20/00* (2013.01); *H02K 7/1823* (2013.01); *H02S 10/10* (2014.12)

(58) Field of Classification Search
CPC ....... F22B 27/16; H02S 10/10; H02K 7/1823; A01G 9/245; F28D 20/00
See application file for complete search history.

(56) References Cited

U.S. PATENT DOCUMENTS

| 8,973,535 B2 * | 3/2015 | Havlena .................. F01K 13/02 |
| | | 122/479.1 |
| 9,516,986 B1 * | 12/2016 | Williams .................. F22B 1/28 |

(Continued)

FOREIGN PATENT DOCUMENTS

| CN | 2632495 Y | 8/2004 |
| CN | 105927954 A | 9/2016 |

(Continued)

*Primary Examiner* — Shafiq Mian
(74) *Attorney, Agent, or Firm* — Muncy, Geissler, Olds & Lowe, P.C.

(57) ABSTRACT

A spraying and re-heating vapor reactor includes: a heat preservation boiler; a vapor reaction boiler disposed in the heat preservation boiler; a re-heating conduit communicating the vapor reaction boiler with a device outside the heat preservation boiler, a high heat capacity material being accommodated within the heat preservation boiler, and surrounding the vapor reaction boiler and the re-heating conduit; a heater heating the high heat capacity material; a sprayer disposed in the vapor reaction boiler; and a liquid supplying tube communicating with the sprayer through structure walls of the heat preservation boiler and the vapor reaction boiler, and supplying an external liquid to the sprayer. The sprayer atomizes the external liquid into an atomized liquid absorbing thermal energy from the high heat capacity material and becomes a low-temperature vapor entering the re-heating conduit and being re-heated into a high-temperature vapor. A generator apparatus is also provided.

11 Claims, 2 Drawing Sheets

(51) Int. Cl.
F28D 20/00 (2006.01)
H02K 7/18 (2006.01)
H02S 10/10 (2014.01)

(56) References Cited

U.S. PATENT DOCUMENTS

| | | |
|---|---|---|
| 10,256,636 B2 | 4/2019 | Luo |
| 2003/0188638 A1* | 10/2003 | Zhang ............... H01M 8/04164 |
| | | 96/294 |
| 2005/0120715 A1* | 6/2005 | Labrador .................. F03G 7/00 |
| | | 60/618 |
| 2018/0172349 A1* | 6/2018 | Knight, Jr. ............ F26B 25/005 |
| 2018/0180277 A1 | 6/2018 | Ni |

FOREIGN PATENT DOCUMENTS

| | | | |
|---|---|---|---|
| CN | 107940426 | A | 4/2018 |
| DE | 1281657 | B | 10/1968 |
| DE | 2117103 | A1 | 10/1972 |
| JP | 2006112746 | A | 4/2006 |
| JP | 2014237118 | A | 12/2014 |
| JP | 2016075419 | A | 5/2016 |

* cited by examiner

SPRAYING AND RE-HEATING VAPOR REACTOR AND GENERATOR APPARATUS USING THE SAME

CROSS-REFERENCE TO RELATED APPLICATIONS

This application claims priority of No. 110135040 filed in Taiwan R.O.C. on Sep. 22, 2021 under 35 USC 119, the entire content of which is hereby incorporated by reference.

BACKGROUND OF THE INVENTION

Field of the Invention

This disclosure relates to a vapor reactor and a generator apparatus using the same, and more particularly to a spraying and re-heating vapor reactor and a generator apparatus using the same.

Description of the Related Art

The solar power generating technology can save the energy and reduce the carbon by using solar cells to convert the optical energy into the electric energy. However, the solar power generating is restricted to the sunshine duration and does not work at night. Due to the flourishing development of the solar cell, there are more and more solar generator apparatuses installed in each area, the considerable electrical power can be provided to the mains supply system in the daytime. Thus, the solar generator apparatus may generate the excess electrical power in the future daytime. Although batteries can be used to store the electric energy, the batteries have the high price and the low efficiency and cause the environment contamination.

In addition, water in the conventional boiler is heated by thermal power to generate the water vapor to drive a vapor generator to generate the power. However, the danger of boiler explosion tends to occur when the boiler is not well monitored.

Thus, how to provide safe and stable energy storage and conversion ways is a problem to be solved by this invention. This disclosure provides further improvements for the SPRAYING HEAT PRESERVATION VAPOR SUPPLYING DEVICE AND GENERATOR APPARATUS USING SUCH DEVICE disclosed in the commonly assigned U.S. Pat. No. 10,256,636 B2 to further provide the stabler high-temperature vapor for the vapor generator.

BRIEF SUMMARY OF THE INVENTION

It is therefore an objective of this disclosure to provide a spraying and re-heating vapor reactor and a generator apparatus using the same, wherein a liquid is atomized into an atomized liquid and the atomized liquid is heated in a multi-stage heating manner to generate a high-temperature vapor provided to a vapor generator for generating the electric power.

To achieve the above-identified object, this disclosure provides a spraying and re-heating vapor reactor including: a heat preservation boiler; a vapor reaction boiler disposed in the heat preservation boiler; a re-heating conduit communicating the vapor reaction boiler with a device outside the heat preservation boiler, wherein a high heat capacity material is accommodated within the heat preservation boiler, and surrounds the vapor reaction boiler and the re-heating conduit; a heater heating the high heat capacity material; a sprayer disposed in the vapor reaction boiler; and a liquid supplying tube communicating with the sprayer through a structure wall of the heat preservation boiler and a structure wall of the vapor reaction boiler, and supplying an external liquid to the sprayer, so that the sprayer atomizes the liquid and absorbs thermal energy from the high heat capacity material and becomes a low-temperature vapor, which enters the re-heating conduit and is re-heated into a high-temperature vapor to be outputted.

This disclosure also provides a generator apparatus including: a solar power generating device for converting solar energy into electric energy; the spraying and re-heating vapor reactor, wherein the heater converts the electric energy into thermal energy to heat the high heat capacity material; and a vapor generator, which communicates with the re-heating conduit and receives the high-temperature vapor to generate electric power and then a recycled vapor.

With the above-mentioned embodiment, the vaporizing of the heat preservation boiler and the re-heating of the re-heating conduit can be adopted to effectively and stably provide the high-temperature vapor, having the temperature approaching the temperature of the high heat capacity material, for the vapor generator, and to increase the power generating efficiency and the thermal efficiency of the high heat capacity material.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
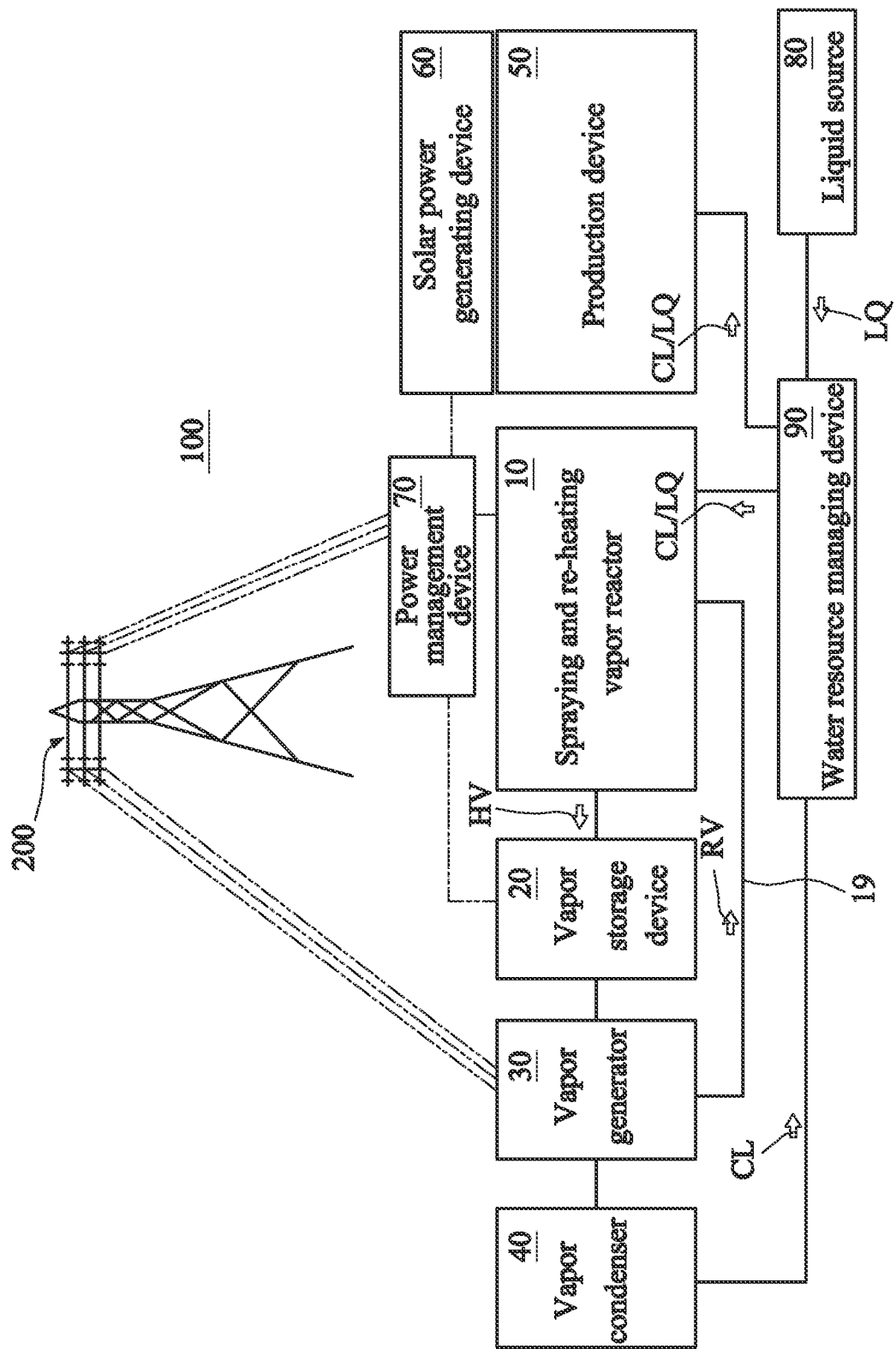
FIG. 1 is a schematic view showing a generator apparatus according to a preferred embodiment of this disclosure.

FIG. 1 is a schematic view showing a generator apparatus according to the preferred embodiment of this disclosure. Referring to FIG. 1, this embodiment provides a generator apparatus 100 including a solar power generating device 60, a spraying and re-heating vapor reactor 10 and a vapor generator 30.

Figure 2:
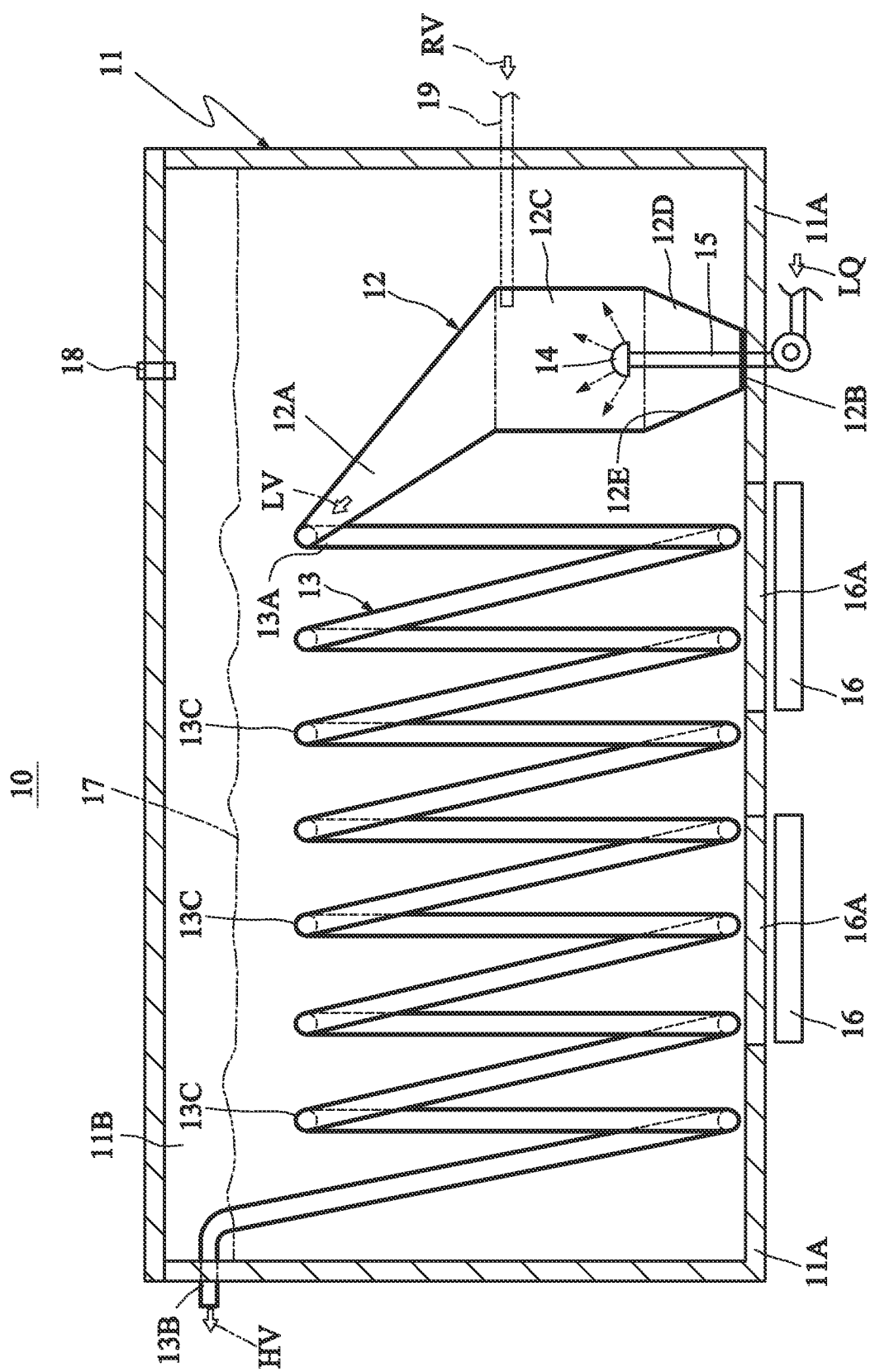
FIG. 2 is a schematic view showing a spraying and re-heating vapor reactor of FIG. 1.

FIG. 2 is a schematic view showing the spraying and re-heating vapor reactor 10 of FIG. 1. Referring to FIGS. 2 and 1, the spraying and re-heating vapor reactor 10 includes a heat preservation boiler 11, a vapor reaction boiler 12, a re-heating conduit 13, a sprayer 14, a liquid supplying tube 15 and a heater 16.

The heat preservation boiler 11 preferably includes a heat insulation or heat insulating material, which may be disposed in a structure wall 11A of the heat preservation boiler 11 to suppress the thermal energy inside the heat preservation boiler 11 from being dissipated to the external environment. The heat insulating material can block the heat transfer, and includes, for example but without limitation, to, glass fiber, asbestos, rockwool, silicate, aerogel blanket, vacuum plate or the like.

The vapor reaction boiler 12 is disposed in the heat preservation boiler 11. The re-heating conduit 13 is a heat exchange tube communicating the vapor reaction boiler 12 with a device outside the heat preservation boiler 11, wherein the device may be the vapor generator 30 or a vapor storage device 20. A high heat capacity material 17 is accommodated within the heat preservation boiler 11, and surrounds the vapor reaction boiler 12 and the re-heating conduit 13. In one example, the vapor reaction boiler 12 includes a tank body made of a stainless steel.

The heater 16 for heating the high heat capacity material 17 may be disposed inside or outside the heat preservation boiler 11. The sprayer 14 is disposed in the vapor reaction boiler 12. The liquid supplying tube 15 communicates with the sprayer 14 through the structure wall 11A of the heat preservation boiler 11 and a structure wall 12B of the vapor reaction boiler 12, and supplies an external liquid LQ from outside to the sprayer 14. The sprayer 14 atomizes the external liquid LQ into an atomized liquid, which absorbs thermal energy of the high heat capacity material 17 and becomes a low-temperature vapor LV. The low-temperature vapor LV enters the re-heating conduit 13 and is re-heated into a high-temperature vapor HV to be outputted.

In one example, the high heat capacity material 17 includes nitrate, such as sodium nitrate, potassium nitrate, lithium nitrate or sodium nitrite. In another example, the high heat capacity material 17 is the multi-element mixed nitrate, such as the four-element mixed nitrate composed of sodium nitrate, potassium nitrate, lithium nitrate and sodium nitrite. When the mass ratio of $NaNO_3:KNO_3:LiNO_3:NaNO_2$ is equal to 0.23:0.407:0.106:0.257, the four-element mixed salt has the melting point as low as 92° C., and the boiling point reaching 559.3° C. By adjusting the mass ratio and type (binary or ternary), different multi-element mixed nitrate materials having different melting points and boiling points can be fabricated to have the melting points ranging from 87 to 97° C. and the boiling points ranging from 540 to 580° C.

In this example, the high heat capacity material 17 is heated by way of electromagnetic heating, so the structure wall 11A of the heat preservation boiler 11 is entirely or partially made of a magnetic permeability material (e.g., iron). In one example, the heat insulating material is not adopted in a portion of the structure wall 11A within an electromagnetic heating range 16A to increase the heating efficiency. So, the structure wall 11A in this case may have portions made of different materials. The electromagnetic heating can provide the contactless heating to the high heat capacity material 17 without physically penetrating through the structure wall 11A, and the heating temperature is not restricted to the working temperature of the physical heating tube. For example, the heating power of the heater 16 can be controlled to heat the high heat capacity material 17 into a liquid state at a temperature ranging from 450 to 580° C., and more particularly ranging from 500 to 600° C. In another example, the heater 16 is connected to the heat preservation boiler 11 to heat the high heat capacity material 17. The thermal energy of the high heat capacity material 17 is transferred to the vapor reaction boiler 12 through the structure wall 12B of the vapor reaction boiler 12. The heater 16 is a stainless steel electric heating tube having a metal tube, in which spiral heating alloy (nickel chromium or iron chromium alloy) wires are axially distributed, magnesia sand with the good thermal insulation property is densely filled into gaps therein, and two ends of the tube are sealed with silicone or ceramic. The stainless steel electric heating tube has the high thermal efficiency, can be conveniently used, can be easily installed, has no contamination, and can be widely used in various heating occasions.

In one example, a standard container, which is usually transported by a cargo truck, may be used as a main portion of the heat preservation boiler 11, the heat insulating material is attached to the inner housing and the outer housing of the standard container, or filled into the housing of the standard container to provide the heat preservation effect. The vapor reaction boiler 12 is disposed near the inner right side of the heat preservation boiler 11, and the re-heating conduit 13 is disposed near the inner left side of the heat preservation boiler 11. Thus, the vapor reaction boiler 12 may be configured to have a biased tapered channel 12A, which is biased from the lower right side to the upper left side in this example, provides a nozzle channel for guiding the vapor in the upper left direction, and communicates with a first end portion 13A of the re-heating conduit 13 to guide the low-temperature vapor LV to the re-heating conduit 13.

The re-heating conduit 13 may also be configured to have a helical conduit having multiple spiral portions 13C. All of the spiral portions 13C are submerged (immersed) into the high heat capacity material 17, so that the low-temperature vapor LV in the re-heating conduit 13 continuously absorbs the thermal energy of the high heat capacity material 17 and becomes the high-temperature vapor HV. In this example, the thermal energy of the high heat capacity material 17 can provide a path for the vapor to be heated and speeded up through the helical conduit, which circulates vertically and extends leftwards. In addition, the re-heating conduit 13 is partially disposed in the heat preservation boiler 11, and has the first end portion 13A and a second end portion 13B. The first end portion 13A communicates with the vapor reaction boiler 12. The second end portion 13B passes through the structure wall 11A of the heat preservation boiler 11 and extends outside the heat preservation boiler 11. In addition, an expansion space 11B is left above the high heat capacity material 17, so that the high heat capacity material 17 can expand in the expansion space 11B, and the second end portion 13B of the re-heating conduit 13 can pass through the structure wall 11A of the heat preservation boiler 11 from the expansion space 11B and extend outside the heat preservation boiler 11. In this case, the high heat capacity material 17 cannot provide the pressure to the second end portion 13B or the high heat capacity material 17 cannot leak from the junction between the second end portion 13B and the heat preservation boiler 11 at risk.

In a non-restrictive example, a molten salt (high heat capacity material) is heated to about 560° C., and the water (liquid LQ) is atomized and sprayed into the vapor reaction boiler 12 to generate the low-temperature vapor LV having the temperature ranging from about 100° C. to 120° C. After passing through the spiral portions 13C of the re-heating conduit 13, the temperature of the low-temperature vapor LV is gradually increased to, 150° C., 250° C., 350° C. and 450° C., for example. Finally, the temperature of the high-temperature vapor HV in the second end portion 13B near the outlet approaches the temperature (560° C.) of the molten salt. The water is preferably the pure water or has the property similar to the pure water. In other examples, other liquids to be heated may also be used.

Optionally, the spraying and re-heating vapor reactor 10 further includes a safety valve 18, which is disposed on the heat preservation boiler 11 and selectively communicates the inside of the heat preservation boiler 11 with the outer environment to prevent the pressure in the heat preservation boiler 11 from getting too high. The vapor reaction boiler 12 has a lower chamber 12D, a middle chamber 12C and an upper chamber (tapered channel 12A). The lower chamber 12D is a cone-type chamber having a conical surface 12E. The liquid supplying tube 15 enters the middle chamber 12C through the lower chamber 12D, the sprayer 14 is disposed in the middle chamber 12C, and the sprayed water mist can be vaporized in the lower chamber 12D, the middle chamber 12C and/or the upper chamber. If there is some water mist, which has not been vaporized, falls on the high-temperature conical surface 12E, the water mist is also vaporized rapidly, and the water vapor enters the re-heating conduit 13 through the upper chamber.

Optionally, the spraying and re-heating vapor reactor 10 may further include a vapor recycling conduit 19, which selectively communicates with the inside or inner chamber of the heat preservation boiler 11, and recycles a recycled vapor RV back to the heat preservation boiler 11 in which the recycled vapor RV is re-heated. The vapor recycling conduit 19 may be disposed in the middle chamber 12C, and may also be disposed in the tapered channel 12A or the lower chamber 12D, and may include a check valve for preventing the vapor from reversing. Furthermore, the configuration of the vapor reaction boiler can be simplified according to the re-heating efficiency of the re-heating conduit, so that the crepe-like compartment layer, provided in U.S. Pat. No. 10,256,636 B2, is not needed, and the structure wall of the vapor reaction boiler is very simple.

In a non-restrictive example, no pressure safety valve is required in the vapor reaction boiler 12. When the pressure in the heat preservation boiler gets too high, the liquid in the liquid supplying tube cannot be sprayed into the heat preservation boiler, so that the effect of automatically cutting off the liquid source is obtained. As long as the liquid does not enter the inner chamber and expand, there is no danger of explosion. Thus, the heat preservation boiler and the vapor reaction boiler are quite safe.

The material of the liquid supplying tube 15 may include a metal material or a heat insulating material. Preferably, the liquid supplying tube 15 does not directly contact the high heat capacity material 17 to prevent the water from being vaporized in the liquid supplying tube 15 to cause dangers.

In the generator apparatus 100, the solar power generating device 60, such as a fixed solar cell module or a sun-tracking solar cell module, converts the solar energy into the electric energy. The heater 16 converts the electric energy into the thermal energy to heat the high heat capacity material 17. The vapor generator 30, such as a steam turbine generator, communicates with the re-heating conduit 13, and receives the high-temperature vapor HV to generate the electric power and then generate the recycled vapor RV. The recycled vapor RV is recycled to the heat preservation boiler 11 and re-heated in the heat preservation boiler 11 through the vapor recycling conduit 19 of the spraying and re-heating vapor reactor 10, and the circulation repeats.

Optionally, the generator apparatus 100 further includes the vapor storage device 20, such as a vapor storage tank. The vapor generator 30 communicates with the re-heating conduit 13 through the vapor storage device 20.

Optionally, the generator apparatus 100 further includes a power management device 70, a vapor condenser 40, a liquid source 80 and a water resource managing device 90.

The power management device 70 is electrically connected to the solar power generating device 60, the spraying and re-heating vapor reactor 10 and a grid 200, and provides power management thereto. For example, the power management device 70 includes a controller, an inverter and the like, can control the spraying and re-heating vapor reactor 10 to provide the high-temperature vapor to the vapor storage device 20 for generating the electric power when the solar power generating device 60 stops generating the electric energy, and can also control the solar power generating device 60 to transmit the electric power to the grid 200 or the spraying and re-heating vapor reactor 10 to perform heating. It is understandable that the vapor generator 30 may also be electrically connected to the grid 200 directly, and may also be electrically connected to the grid 200 through the power management device 70. The vapor condenser 40 communicating with the vapor generator 30 condenses the recycled vapor RV to generate a condensed liquid CL. The liquid source 80 supplies the liquid LQ. The water resource managing device 90 includes a controller, a control valve and the like, communicates with the vapor condenser 40 and a production device 50, and provides the water resource management.

In this example, the solar power generating device 60 is disposed above the production device 50. The production device 50 is a crop production device, for example. The water resource managing device 90 selectively supplies the condensed liquid CL to the production device 50 to enhance the environment heating effect of the production device 50 and prevent the crops from being damaged by the cold snap. In addition, the water resource managing device 90 may include a reverse osmosis water softener for softening the condensed liquid CL to obtain soft water to be supplied to the spraying and re-heating vapor reactor 10 for recycling. The water resource managing device 90 may also include fluid control devices, such as a check valve, a three-pass valve and the like, to provide the selective water resource flow management.

With the spraying and re-heating vapor reactor and the generator apparatus using the same according to the embodiment, when the excess electric power is generated by the solar power generating device under the sunshine, the power management device controls to provide the electric power of the solar power generating device to the heater for heating the high heat capacity material. When the sunshine disappears, the power management device controls the liquid source to provide the liquid to the inner chamber of the heat preservation boiler to generate the vapor, so that the vapor generator may generate the electric power using the vapor, and the optimum management of the electric power can be performed. In addition, the vaporizing of the heat preservation boiler and the re-heating of the re-heating conduit can be adopted to effectively and stably provide the high-temperature vapor, having the temperature approaching the temperature of the high heat capacity material, for the vapor generator, and to increase the power generating efficiency and the thermal efficiency of the high heat capacity material.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A spraying and re-heating vapor reactor, comprising:
a heat preservation boiler;
a vapor reaction boiler disposed in the heat preservation boiler;
a re-heating conduit communicating the vapor reaction boiler with a device outside the heat preservation boiler, wherein a high heat capacity material is accommodated within the heat preservation boiler, and surrounds the vapor reaction boiler and the re-heating conduit;

a heater heating the high heat capacity material;

a sprayer disposed in the vapor reaction boiler; and a liquid supplying tube, which communicates with the sprayer through a structure wall of the heat preservation boiler and a structure wall of the vapor reaction boiler, and supplies an external liquid to the sprayer, so that the sprayer atomizes the external liquid into an atomized liquid, which absorbs thermal energy from the high heat capacity material and becomes a low-temperature vapor, which enters the re-heating conduit and is re-heated into a high-temperature vapor to be outputted.

2. The spraying and re-heating vapor reactor according to claim 1, wherein the vapor reaction boiler has a biased tapered channel, which communicates with a first end portion of the re-heating conduit and guides the low-temperature vapor to the re-heating conduit.

3. The spraying and re-heating vapor reactor according to claim 2, wherein the re-heating conduit has a helical conduit having multiple spiral portions, and all of the spiral portions are submerged into the high heat capacity material, so that the low-temperature vapor in the re-heating conduit continuously absorbs the thermal energy of the high heat capacity material and becomes the high-temperature vapor.

4. The spraying and re-heating vapor reactor according to claim 1, wherein the re-heating conduit is partially disposed in the heat preservation boiler, and has a first end portion and a second end portion, the first end portion communicates with the vapor reaction boiler, and the second end portion passes through the structure wall of the heat preservation boiler and extends outside the heat preservation boiler.

5. The spraying and re-heating vapor reactor according to claim 4, wherein the high heat capacity material is heated to become a liquid at a temperature ranging from 450 to 580° C., an expansion space is left above the high heat capacity material, and the second end portion of the re-heating conduit passes through the structure wall of the heat preservation boiler from the expansion space and extends outside the heat preservation boiler.

6. The spraying and re-heating vapor reactor according to claim 1, further comprising a vapor recycling conduit, which selectively communicates with the heat preservation boiler and recycles a recycled vapor back to the heat preservation boiler, in which the recycled vapor is re-heated.

7. A generator apparatus, comprising:

a solar power generating device for converting solar energy into electric energy;

the spraying and re-heating vapor reactor according to claim 1, wherein the heater converts the electric energy into thermal energy to heat the high heat capacity material; and a vapor generator, which communicates with the re-heating conduit and receives the high-temperature vapor to generate electric power and then a recycled vapor.

8. The generator apparatus according to claim 7, wherein the recycled vapor is recycled to the heat preservation boiler and re-heated in the heat preservation boiler through a vapor recycling conduit of the spraying and re-heating vapor reactor.

9. The generator apparatus according to claim 7, further comprising a vapor storage device, wherein the vapor generator communicates with the re-heating conduit through the vapor storage device.

10. The generator apparatus according to claim 7, further comprising:

a power management device, which is electrically connected to the solar power generating device, the spraying and re-heating vapor reactor and a grid, and provides power management, wherein the solar power generating device disposed above a production device;

a vapor condenser, which communicates with the vapor generator and condenses the recycled vapor to generate a condensed liquid;

a liquid source for providing the external liquid; and a water resource managing device, which communicates with the vapor condenser and the production device, and provides water resource management.

11. The generator apparatus according to claim 10, wherein the production device is a crop production device, and the water resource managing device selectively supplies the condensed liquid into the production device to enhance an environment heating effect of the production device.

* * * * *